US010339157B2

(12) United States Patent
Jain et al.

(10) Patent No.: US 10,339,157 B2
(45) Date of Patent: Jul. 2, 2019

(54) HIVE TABLE LINKS (71) Applicant: Facebook, Inc., Menlo Park, CA (US)

(72) Inventors: Namit Jain, Hyderbad, IN (US);
Raghotham Sathyanarayana Murthy, San Francisco, CA (US); Sambavi Muthukrishnan, Palo Alto, CA (US); Bhushan Mandhani, Union Ciy, CA (US)

(73) Assignee: Facebook, Inc., Menlo Park, CA (US)

( * ) Notice: Subject to any disclaimer, the term of this patent is extended or adjusted under 35 U.S.C. 154(b) by 90 days.

(21) Appl. No.: 13/766,512

(22) Filed: Feb. 13, 2013

(65) Prior Publication Data
US 2014/0229422 A1    Aug. 14, 2014

(51) Int. Cl.
*G06F 16/20*    (2019.01)
*G06F 16/28*    (2019.01)
(Continued)

(52) U.S. Cl.
CPC ............ *G06F 16/283* (2019.01); *G06F 16/21* (2019.01); *G06F 16/256* (2019.01); *G06F 16/972* (2019.01); *G06F 16/25* (2019.01)

(58) Field of Classification Search
None
See application file for complete search history.

(56) References Cited

U.S. PATENT DOCUMENTS 5,675,785 A    10/1997    Hall et al.
6,671,689 B2    12/2003    Papierniak
(Continued)

FOREIGN PATENT DOCUMENTS

CN    1786997 A    6/2006
CN    101620609 B    3/2012
(Continued)

OTHER PUBLICATIONS

Namit, J etal. "Links—Apache Hive—Apache Software Foundation," May 23, 2012, pp. 1-21. https://cwiki.apache.org/confluence/display/Hive/Links (Year: 2012).*
(Continued)

*Primary Examiner* — Mark D Featherstone
*Assistant Examiner* — Diedra McQuitery
(74) *Attorney, Agent, or Firm* — FisherBroyles, LLP (57) ABSTRACT Some embodiments include a plurality of virtual data warehouses having table link capabilities that are built on top of a data center (e.g., running Apache Hive). Each virtual data warehouse can be modeled as a database and manage data in forms of database tables. The virtual data warehouse can include links which import tables from other virtual data warehouses by reference. Each link may contain partition metadata for the table partitions by dates of the source table and retention metadata to declare the needed retention time period for the partitions of the source table. The links can be dynamic and update when the corresponding source table receives new partitions or drops partitions. When a virtual data warehouse is migrated to another data center, the system can retain necessary table partitions on the current data center based on the partition and retention metadata of the links.

7 Claims, 7 Drawing Sheets (51) Int. Cl.
*G06F 16/25* (2019.01)
*G06F 16/958* (2019.01)
*G06F 16/21* (2019.01)

(56) References Cited

U.S. PATENT DOCUMENTS

| | | | |
|---|---|---|---|
| 6,823,391 | B1 | 11/2004 | Deen et al. |
| 7,305,432 | B2 | 12/2007 | Feng et al. |
| 7,370,366 | B2 | 5/2008 | Lacan et al. |
| 7,519,608 | B2 | 4/2009 | Foster |
| 7,818,581 | B2 | 10/2010 | Lacan et al. |
| 8,321,438 | B1 | 11/2012 | Smith et al. |
| 8,341,345 | B2 | 12/2012 | Tulskie et al. |
| 8,392,969 | B1* | 3/2013 | Park ............... H04L 63/104 726/4 |
| 8,615,503 | B2 | 12/2013 | Adyilamuriyil et al. |
| 8,849,771 | B2 | 9/2014 | Berg-Sonne |
| 9,355,060 | B1* | 5/2016 | Barber ............. G06F 15/167 |
| 9,417,917 | B1* | 8/2016 | Barber ............. G06F 9/5005 |
| 2002/0099563 | A1 | 7/2002 | Adendorff et al. |
| 2002/0133368 | A1 | 9/2002 | Strutt et al. |
| 2004/0210452 | A1 | 10/2004 | Aboujaoude et al. |
| 2005/0149496 | A1 | 7/2005 | Mukherjee et al. |
| 2005/0210049 | A1* | 9/2005 | Foster ............. G06F 21/6227 |
| 2005/0262129 | A1 | 11/2005 | Hacigumus et al. |
| 2006/0253435 | A1 | 11/2006 | Nishizawa et al. |
| 2007/0033340 | A1* | 2/2007 | Tulskie ............. G06F 3/0605 711/108 |
| 2010/0005055 | A1* | 1/2010 | An et al. .................... 707/2 |
| 2010/0017415 | A1 | 1/2010 | Kurumai |
| 2011/0004622 | A1 | 1/2011 | Marson |
| 2011/0066617 | A1 | 3/2011 | Liu et al. |
| 2012/0054146 | A1* | 3/2012 | Gupta et al. ............ 707/602 |
| 2012/0054182 | A1* | 3/2012 | Gupta et al. ............ 707/737 |
| 2012/0066755 | A1 | 3/2012 | Peddada |
| 2012/0096521 | A1 | 4/2012 | Peddada |
| 2012/0102429 | A1* | 4/2012 | Naderi et al. .......... 715/783 |
| 2012/0143810 | A1* | 6/2012 | Berg-Sonne ........ G05B 15/02 706/47 |
| 2012/0166385 | A1 | 6/2012 | Devadoss et al. |
| 2012/0254111 | A1* | 10/2012 | Carmichael ........ H04L 43/0876 707/627 |
| 2013/0006950 | A1* | 1/2013 | Adayilamuriyil ..... G06F 16/278 707/704 |
| 2013/0007845 | A1 | 1/2013 | Chang |
| 2013/0179894 | A1* | 7/2013 | Calder ............... G06F 9/5027 718/104 |
| 2014/0112319 | A1* | 4/2014 | Morris ............... H04W 4/12 370/338 |

FOREIGN PATENT DOCUMENTS

| | | |
|---|---|---|
| JP | 2000148676 A | 5/2000 |
| JP | 2004185095 A | 7/2004 |
| JP | 2009508208 A | 2/2009 |
| JP | 2009146350 A | 7/2009 |
| JP | 2010026653 A | 2/2010 |
| JP | 2010250567 A | 11/2010 |
| JP | 2011034589 A | 2/2011 |
| WO | WO-03036520 A1 | 5/2003 |
| WO | WO-2009155741 A1 | 12/2009 |
| WO | WO-201231278 A1 | 3/2012 |

OTHER PUBLICATIONS

"Welcome to Hive!", 2013, Hadoop Hive, downloaded on Jun. 27, 2013 at <http://hive.apache.orq/>.
"Links", 2013, Apache Hive, downloaded on Jun. 27, 2013 at <https://cwiki.apache.org/confluence/display/Hive/Links>.
"Apache Hive", 2013, Wikipedia, downloaded on Jun. 27, 2013 at <https://en.wikipedia.org/wiki/Apache_Hive>.
European Search Report dated Mar. 27, 2014 for European Application No. 14154417.1 filed Feb. 10, 2014, 112 pages.
International Search Report and Written Opinion dated May 8, 2014, for International Patent Application No. PCT/US2014/012123 filed Jan. 17, 2014, pp. 1-9.
European Patent Office Communication pursuant to Article 94(3) EPC for European Patent Application No. 14154417.1 filed for Facebook, Inc. dated Aug. 2, 2017.
Namit, J. et al. "Links—Apache Hive—Apache Software Foundation" May 23, 2012, pp. 1-21. Retrieved from https://cwiki.apache.org/confluence/display/Hive/Links.
Notification of Reason for Rejection dated Nov. 28, 2017 for Japanese Patent Office Application No. 2015-558013 for Facebook Inc.
Preliminary Office Action dated Nov. 20, 2017 for Israeli Patent Application No. 240497 of Facebook, Inc.
Wilmering,T.J. et al. "A metadata, architecture for mediated integration of product usage data" IEEE Systems Readiness Technology Conference. Sep. 22, 2003, pp. 564-575.

* cited by examiner

HIVE TABLE LINKS

TECHNICAL FIELD

Various embodiments of the present invention generally relate to multi-tenancy data warehouse infrastructures. More specifically, various embodiments of the present invention relate systems and methods for using table links within a multi-tenancy data warehouse to reduce the amount of data replication.

BACKGROUND

A data warehouse, in the broadest sense, is a database that contains large stores of current and historical data. In some cases, the data may be integrated from multiple data sources (e.g., marketing databases, sales databases, user databases, and other transactional databases used to maintain the most recent data). Typically, the data is organized and stored within the data warehouse. For example, in some cases, the data may be stored as a series of snapshots. In other cases, the data may be aggregated at a specific time interval (e.g., three months, six months, or older) and/or into specific subject areas.

When data is integrated from multiple data sources, the data warehouse can provide consistent codes, descriptions, fields, and flagging. For example, suppose that the multiple data sources have different identification mechanisms for a product, the data warehouse may provide a uniform identification mechanism for the product. The data stored in the data warehouse can also be analyzed with tools such as online analytical processing (OLAP) and data mining tools. The results from these analyzes can be used for a variety of business purposes such as generating various analytics and creating reports.

Over time, data warehouses can start running out of space. One solution is to split the data warehouse into smaller warehouses. These smaller warehouses could be geographically distributed. In some cases, each of the smaller data warehouse may be designed for a specific group of users (e.g., a team) or may host information regarding a particular subject. However, some groups of users or particular subjects may need access to the same data. Simply copying the same data to each of the smaller warehouses is inefficient. Another solution to the capacity problem is to delete data from the data warehouse. However, this data might be valuable in future data mining or analysis activities. As a result, more efficient techniques are needed for managing data within these data warehouses.

SUMMARY

Systems and methods are described for providing table links within a data warehouse to reduce the amount of data replication. In accordance with various embodiments, a data query can be received from a tenant assigned to a first virtual data warehouse (e.g., a database) within a multi-tenancy data warehouse. Based on the data query a set of information can be generated indicating data the tenant is authorized to access within the multi-tenancy data warehouse. Then, the tenant can declare a subset of the data which the tenant can access and desires to utilize. Any data associated with the declaration that is located outside of the first virtual data warehouse can be imported using a link identifying a set of parameters (e.g., data location, time range, etc.) for retrieving the data. In addition, in some embodiments, the link may only provide read-only access to data outside of the first virtual data warehouse.

In one or more embodiments, there may be multiple physical data centers and the first virtual data warehouse may be part of a first physical data center. A determination can be made as to whether a subset of the data declared by the tenant is in a second physical data center (e.g., in a virtual data warehouse). If the data is located at the second physical data center, the data from the second physical data center can be cached in the first physical data center. Some embodiments monitor the utilization or access of the data outside of the first virtual data warehouse. A determination can be made as to whether the utilization of the data only includes data from a smaller time range than a time range to which the link provides access. When this is detected, the set of parameter in the link can be updated so that the link only retrieves the data from the smaller time range.

Embodiments of the present invention also include computer-readable storage media containing sets of instructions to cause one or more processors to perform the methods, variations of the methods, and other operations described herein.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present invention will be described and explained through the use of the accompanying drawings in which.

The drawings have not necessarily been drawn to scale. For example, the dimensions of some of the elements in the figures may be expanded or reduced to help improve the understanding of the embodiments of the present invention. Similarly, some components and/or operations may be separated into different blocks or combined into a single block for the purposes of discussion of some of the embodiments of the present invention. Moreover, while the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Various embodiments of the present invention generally relate to multi-tenancy data warehouse infrastructures. More specifically, various embodiments of the present invention relate systems and methods for using table links within a multi-tenancy data warehouse to reduce the amount of data replication. Traditionally, the infrastructure provided by Apache Hive allows for the setup of a single shared warehouse and the authorization model allows for access control within this warehouse if needed. However, growth beyond a single warehouse (when datacenter capacity limits are reached), or separation of capacity usage and allocation, requires the creation of multiple warehouses with each warehouse mapping to its own Hive metastore. A physical warehouse can be a single Hive metastore, the Hadoop cluster it maps to, and the data in it.

In organizations with a large number of teams needing a warehouse, there is a need to be able to: 1) Maximize sharing of physical clusters to keep operational costs low; and 2) Clearly identify and track capacity usage by teams in the data warehouse. One of the traditional solutions is to use a single shared warehouse. However, using a single warehouse has the following disadvantages: 1) When the warehouse reaches datacenter capacity limits, it is hard to identify self-contained pieces that can be migrated out; and 2) Capacity tracking and management becomes an issue.

An alternative solution is to create a new physical warehouse per team (1:1 mapping). However, this is not a viable solution since the physical resources are not shared across teams and the operational cost is high. Further, data may not be cleanly partition-able and will end up being replicated in multiple physical warehouses. In addition, the number of physical warehouses that might be needed by some companies could be impractical from an operational perspective.

In contrast, various embodiments of the present invention provide for a system that includes a plurality of virtual data warehouses built on top of a data center. For example, the data center may be running Apache Hive. Each virtual data warehouse can be modeled as a database and manages data in forms of database tables. The virtual data warehouse can include links which import tables from other virtual data warehouses by references. Each link may contain partition metadata for the table partitions by dates of the source table. The link can also include retention metadata to declare the needed retention time period for the partitions of the source table. The links can be dynamic and update when the corresponding source table receives new partitions or drops partitions. When a virtual data warehouse is migrated to another data center, the system can retain necessary table partitions to remain on the current data center based on the partition metadata and retention metadata of the links.

While, for convenience, embodiments of the present invention are described with reference to data warehouses using Apache Hive infrastructure, embodiments of the present invention are equally applicable to data warehouse infrastructures. In addition, the techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Terminology

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary channels or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to various embodiments," "in the embodiments shown," "in other embodiments," and the like generally mean the particular feature, structure, or characteristic following the phrase is included in at least one embodiment of the present invention, and may be included in more than one embodiment of the present invention. In addition, such phrases do not necessarily refer to the same embodiments or to different embodiments.

If the specification states a component or feature "may," "can," "could," or "might" be included or have a characteristic, that particular component or feature is not required to be included or have the characteristic.

The term "module" refers broadly to software, hardware, or firmware (or any combination thereof) components. Modules are typically functional components that can generate useful data or other output using specified input(s). A module may or may not be self-contained. An application program (also called an "application") may include one or more modules, or a module can include one or more application programs.

General Description

Figure 1:
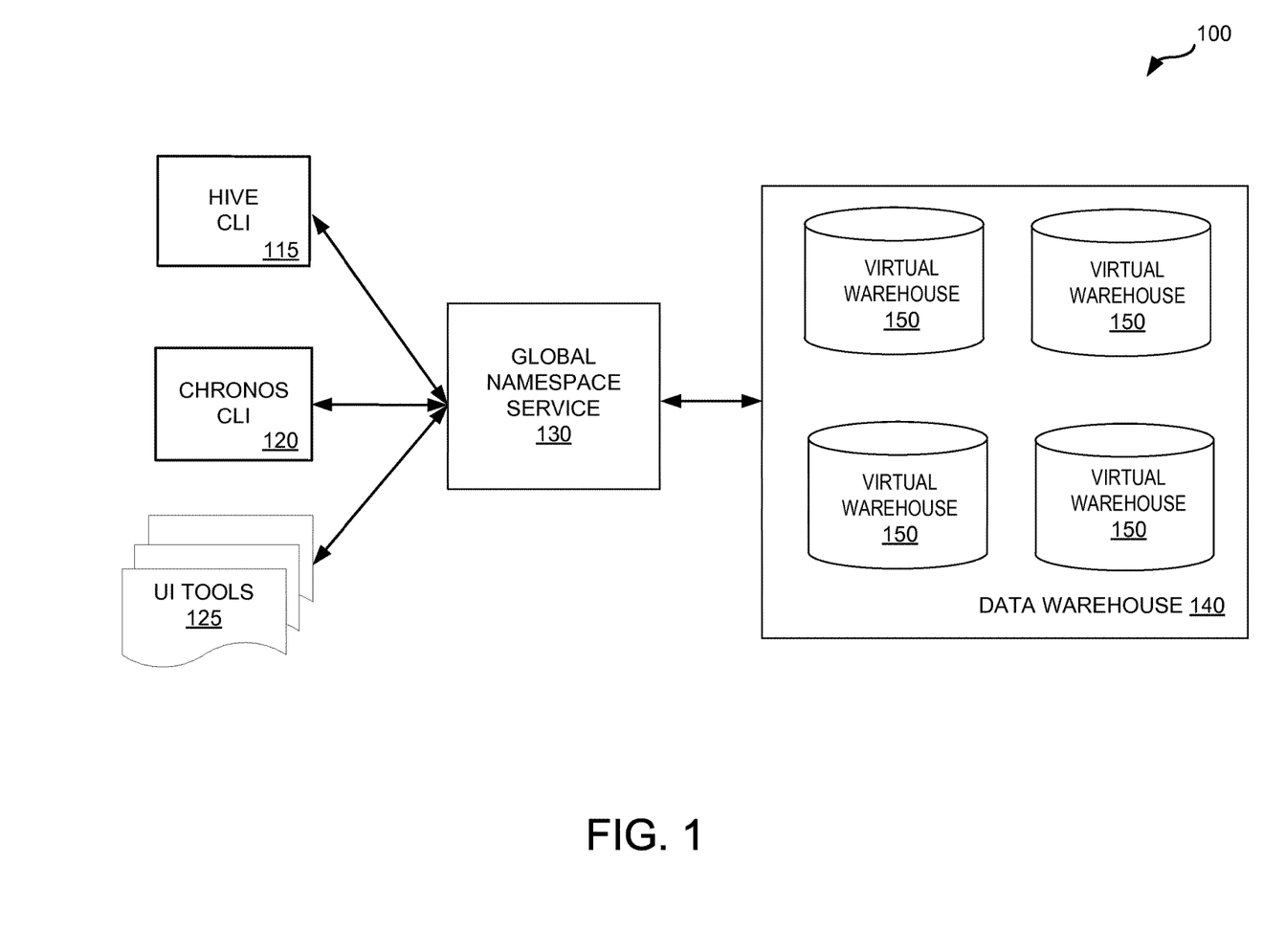
FIG. 1 illustrates an example of a multi-tenancy data warehouse environment in which some embodiments of the present invention may be utilized.

FIG. 1 illustrates an example of a multi-tenancy data warehouse environment 100 in which some embodiments of the present invention may be utilized. As illustrated in FIG. 1, the environment can include various command line interfaces (e.g., HIVE CLI 115 and CHRONOS CLI 120) and other user interface tools 125, global namespace service 130, and one or more multi-tenancy data warehouses 140. Data warehouse 140 includes multiple virtual warehouses 150 (namespace). In accordance with various embodiments, the multiple virtual warehouses 150 can be housed in the same physical data warehouse 140 with other virtual warehouses to create a multi-tenancy environment. Each of the multiple virtual warehouses may be portable to allow each of the virtual warehouses may be moved from one physical warehouse to another.

By creating self-contained namespaces (i.e., virtual warehouses), various embodiments allow for capacity planning based on the virtual warehouse growth. Mapping many namespaces to one physical data warehouse keeps the operational cost low. Also, if a physical warehouse reaches capacity limits, portability will allow seamless migration of the namespace to another physical warehouse. Note that users can operate on multiple namespaces simultaneously although they are likely to most often operate within one namespace. As a result, in some embodiments namespaces do not solve the problem of ensuring that users only have access to a subset of data in the warehouse.

In accordance with various embodiments, an Apache Hive instance does not operate across physical data warehouses 140. Instead, these embodiments utilize a namespace service 130 external to the Hive that has metadata on namespace locations across the Hive instances, and allows importing data across Hive instances using replication. In other embodiments, the namespace modeling can be created as a role in Hive (e.g., using the authorization model). A role is created for each namespace and users operating in that namespace belong to that role. Access to data outside the namespace is made possible by granting permissions to the foreign table/view to the role for the namespace.

A user or tenant who belongs to multiple namespaces (and hence multiple roles) will be able to operate on all data across those namespaces at any point in time, so namespaces are no longer self-contained. Imagine the situation of user A has access to namespaces N1 and N2 running a query on both simultaneously. Either of those queries will be able to access data across both N1 and N2 which will be restricted in various embodiments.

From Hive, various embodiments of the present invention impose one or more of the following additional constraints: 1) Provide metadata to identify tables and queries that belong to one namespace; 2) Provide controls to prevent operating on tables outside the namespace; and 3) Provide commands to explicitly request that tables/partitions in a first namespace be made available in a second namespace (since some tables/partitions may be needed across multiple namespaces). Some embodiments provide for the modeling of namespaces (i.e., virtual warehouses) as databases. No explicit accounting/tracking of tables/partitions/views that belong to a namespace is needed since a database provides that already. The namespace can prevent access using a two part name syntax (Y.T) to ensure the database is self-contained in one or more embodiments.

In order to model table/partition imports across namespaces, various embodiments use links in Hive. These embodiments use various commands to create, alter, and drop links to tables in other databases. The links may not make copies of the table/partition and hence avoid data duplication in the same physical warehouse. For example, suppose that namespace A resides in database A and that namespace B resides in database B. Access across these namespace using A.T or B.T syntax is disabled in 'namespace' mode. The user is importing table T1 from B into A. The user issues a CREATE LINK command, which creates metadata in the target namespace A for the table+ metadata to indicate which object is linked. The ALTER LINK ADD PARTITION command is used to add partitions to the link. These partitions are modeled by replicating partition-level metadata in the target database A for the accessible partitions. The link can be dynamic, which means it is kept updated as the source table gets new partitions or drops partitions.

Figure 2:
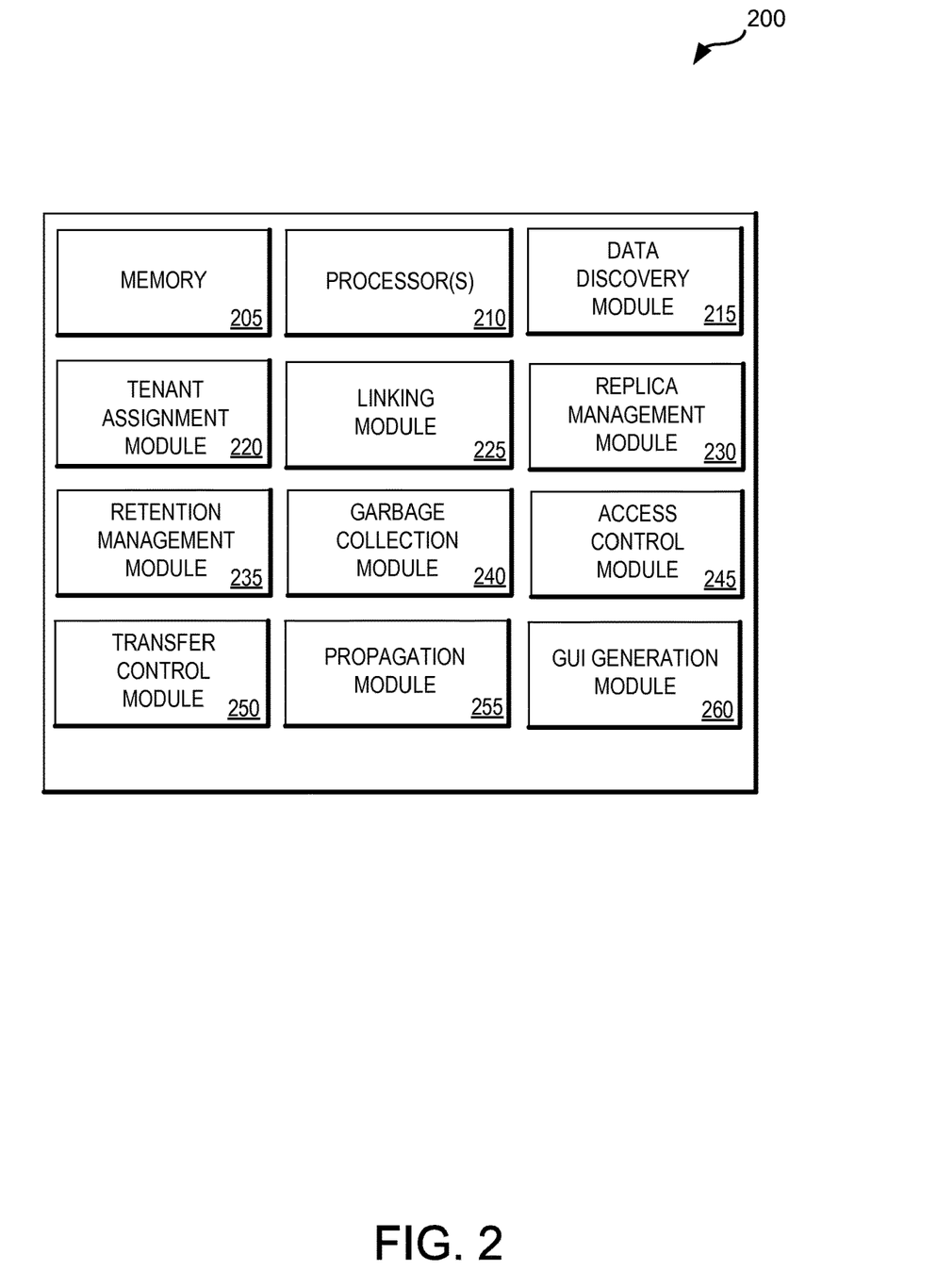
FIG. 2 shows a block diagram with components which can be used in accordance with one or more embodiments of the present invention.

FIG. 2 shows a block diagram with components which can be used in accordance with one or more embodiments of the present invention. According to the embodiments shown in FIG. 2, the system can include memory 205, one or more processors 210, data discovery module 215, tenant assignment module 220, linking module 225, replica management module 230, retention management module 235, garbage collection module 240, access control module 245, transfer control module 250, propagation module 255, and graphical user interface (GUI) generation module 260. Other embodiments of the present invention may include some, all, or none of these modules and components along with other modules, applications, and/or components. Still yet, some embodiments may incorporate two or more of these modules into a single module and/or associate a portion of the functionality of one or more of these modules with a different module. For example, in one embodiment, data discovery module 215 and access control module 245 can be combined into a single module for accessing data within a data warehouse.

Memory 205 can be any device, storage media, mechanism, or populated data structure used for storing information. In accordance with some embodiments of the present invention, memory 205 can encompass any type of, but is not limited to, volatile memory, nonvolatile memory, and dynamic memory. For example, memory 205 can be random access memory, memory storage devices, optical memory devices, magnetic media, floppy disks, magnetic tapes, hard drives, SIMMs, SDRAM, DIMMs, RDRAM, DDR RAM, SODIMMS, erasable programmable read-only memories (EPROMs), electrically erasable programmable read-only memories (EEPROMs), compact disks, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 205.

Memory 205 may be used to store instructions for running one or more applications or modules on processor(s) 210. For example, memory 205 could be used in one or more embodiments to house all or some of the instructions needed to execute the functionality of data discovery module 215, tenant assignment module 220, linking module 225, replica management module 230, retention management module 235, garbage collection module 240, access control module 245, transfer control module 250, propagation module 255, and/or GUI generation module 260.

Data discovery module 215 provides for various tools and interfaces for allowing tenants to discover data within a multi-tenancy data warehouse having multiple virtual warehouses each assigned to a tenant. When a tenant submits a data query, data discovery module 215 can search across all of the virtual warehouses and, in some cases, within other multi-tenancy data warehouses. For example, when the multi-tenancy data warehouses are running Apache Hive, data discovery module 215 may sit on top of the multi-tenancy data warehouse to support searching within all of the virtual data warehouses within the multi-tenancy data warehouse as well as in other multi-tenancy data warehouses. When the virtual data warehouses are modeled as virtual data warehouse (e.g., namespaces or databases), data discovery module 215 can receive search queries from the first tenant assigned to the virtual data warehouse and search the physical data warehouse by accessing indexes associated with databases in the multi-tenancy data warehouse.

Tenant assignment module 220 allows administrators of the system to assign one or more tenants to each of the virtual data warehouses. Each tenant may have complete access to the virtual data warehouses to which they are assigned. The administrators may also specify segments or categories of data to which the tenant may also access even if they are within other virtual data warehouses to which the tenant is not assigned. In some embodiments, GUI generation module 260 can be used by tenant assignment module 220 to generate one or more graphical user interfaces to allow the administrators to create a virtual data warehouse, select a virtual data warehouse, and/or assign one or more tenants to a virtual data warehouse.

When one of the tenants discovers data outside of the virtual warehouse to which they are assigned, linking module 225 can be used to generate a link to a subset of the data or a data table in the other virtual warehouse (e.g., database). By creating the link, various embodiments provide access to the data to the tenant without having to copy the data to the tenant's virtual warehouse. The links created by linking module 225 may be read only links and can include a set of parameters identifying the data to be imported. For example, the set of parameters may identify a data center, a data warehouse, the virtual warehouse where the data or table is located, the tenant retrieving the data, a time frame (e.g., past thirty days of data), metadata, and/or other parameters that may be useful for managing the links and/or retrieving the data.

In some cases, the data requested by the tenant may be stored within a different data center or physical data warehouse. Replica management module 230 can monitor data requests and determine that the tenant requested data from the second physical data warehouse. Replica management module can then copy the requested data from the second physical data warehouse to the physical data warehouse to which the tenant is associated.

Some embodiments of the present invention allow for various holds (e.g., legal holds) or other data retention policies to be enforced. Retention management module 235 can create a virtual warehouse associated with the retention policy. Then linking module 225 can be used to create links to the data that needs to be maintained under the retention policy.

As changes to the data warehouses occur, garbage collection module 240 can be used to remove unused data and links. In addition, garbage collection module 240 can monitor the use of the links and update the links based on the current use of the retrieved data. For example, a link may retrieve thirty days of data on a particular subject. However, if the tenant is only consistently using that last three days of the data (e.g., to generate reports), then garbage collection module 240 can update the link so that only the last three days of the data is retrieved. As a result of this intelligent garbage collection, in some cases, network resources may be reduced since less data is automatically retrieved.

Access control module 245 may be communicably coupled to the data discovery module 215 and configured to determine which data on the virtual warehouses within the data warehouse each tenant is authorized to access. Access permissions may be changed over time either thought pre-set rules or through manual changes entered by an administrator through a graphical user interface screen. As these changes are made, for example, propagation module 255 may update the links (e.g., delete a link, update which data is imported, etc.) within the data warehouse accordingly.

In various embodiments, a virtual warehouse may be transferred from a first data warehouse to second data warehouse. These types of transfer may occur for a variety of reasons. For example, when a data warehouse is about to reach capacity a virtual warehouse may be transferred. As another example, the transfer may be based on physical location of the tenants to allow the virtual data warehouse to be closer in physical proximity. Transfer control module 250 monitors the status of each of the data centers and manages the transfer of the virtual warehouse from one data center to another. Transfer control module 250 may request that propagation module 255 update any links to the virtual data warehouse to indicate the new location.

GUI generation module 260 can be used to generate one or more graphical user interface screens. These screens can be used to display information (e.g., data center capacity, generated reports, and data warehouse topology) to users. In some embodiments, the graphical user interface screens can be used to assign tenants to one or more of the virtual data warehouses, to define access policies, to define data retention policies, and the like.

Figure 3:
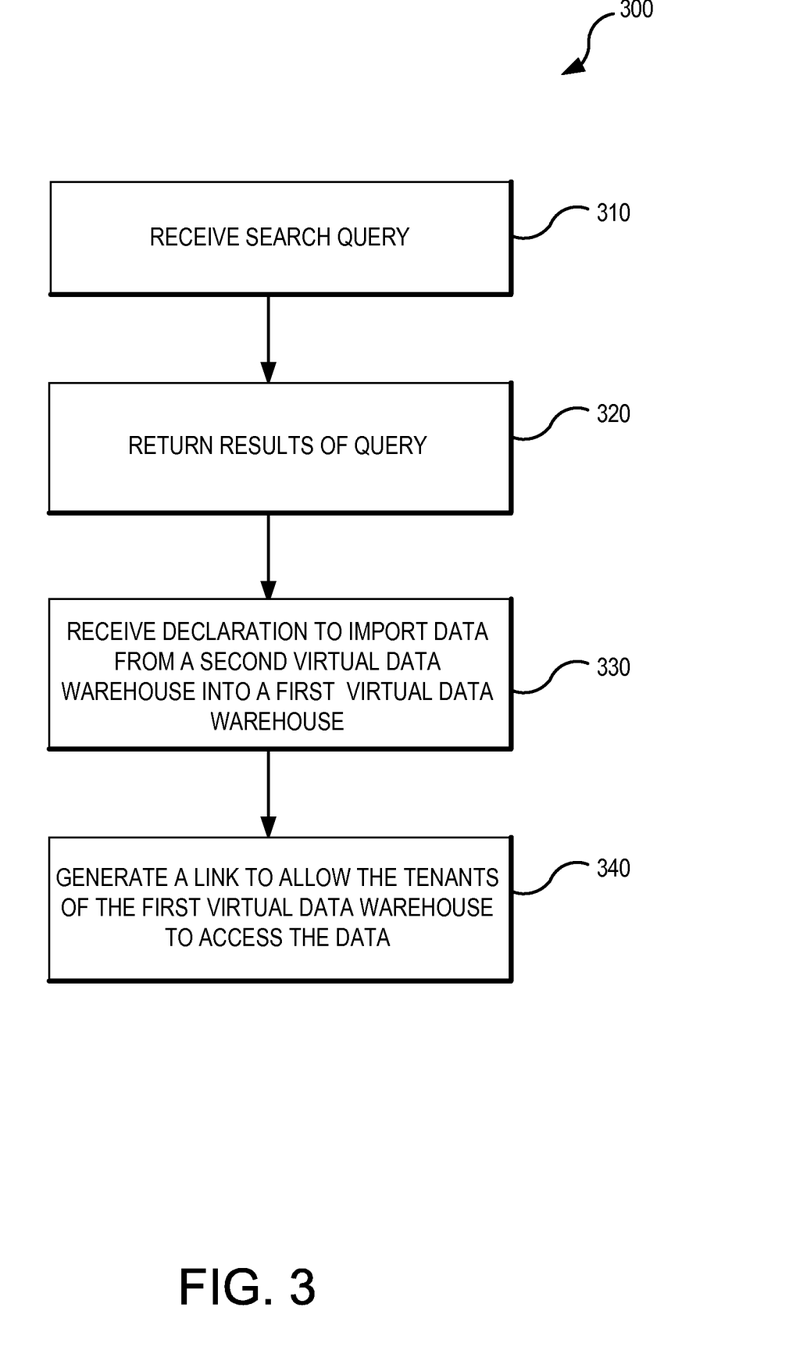
FIG. 3 is a flowchart with a set of operations for generating a table link in accordance with various embodiments of the present invention.

FIG. 3 is a flowchart with a set of operations 300 for generating a table link in accordance with various embodiments of the present invention. The operations illustrated in FIG. 3 may be performed by one or more modules or components such as data discovery module 215, linking module 225, and/or processor(s) 210. Receiving operation 310 receives a search query from a tenant and searches the data warehouse for data that complies with the search query. Return operation 320 returns the results to the tenant (e.g., using a graphical user interface screen generated by GUI generation module 260). The results can include data from a first virtual warehouse (e.g., database) associated with the tenant and/or data from a second virtual warehouse that is associated with another tenant.

The tenant can then declare during declaration operation 330 which data should be imported from the second virtual warehouse into the first virtual warehouse associated with the tenant. The declaration received by the tenant may be subject to one or more additional restrictions (e.g., time limits or notification restrictions). Generation operation 340 can then generate a link to allow the tenant(s) of the first virtual warehouse to access the data located in the second virtual warehouse. In some cases, the link includes a set of information describing the data to be retrieved or imported.

Figure 4:
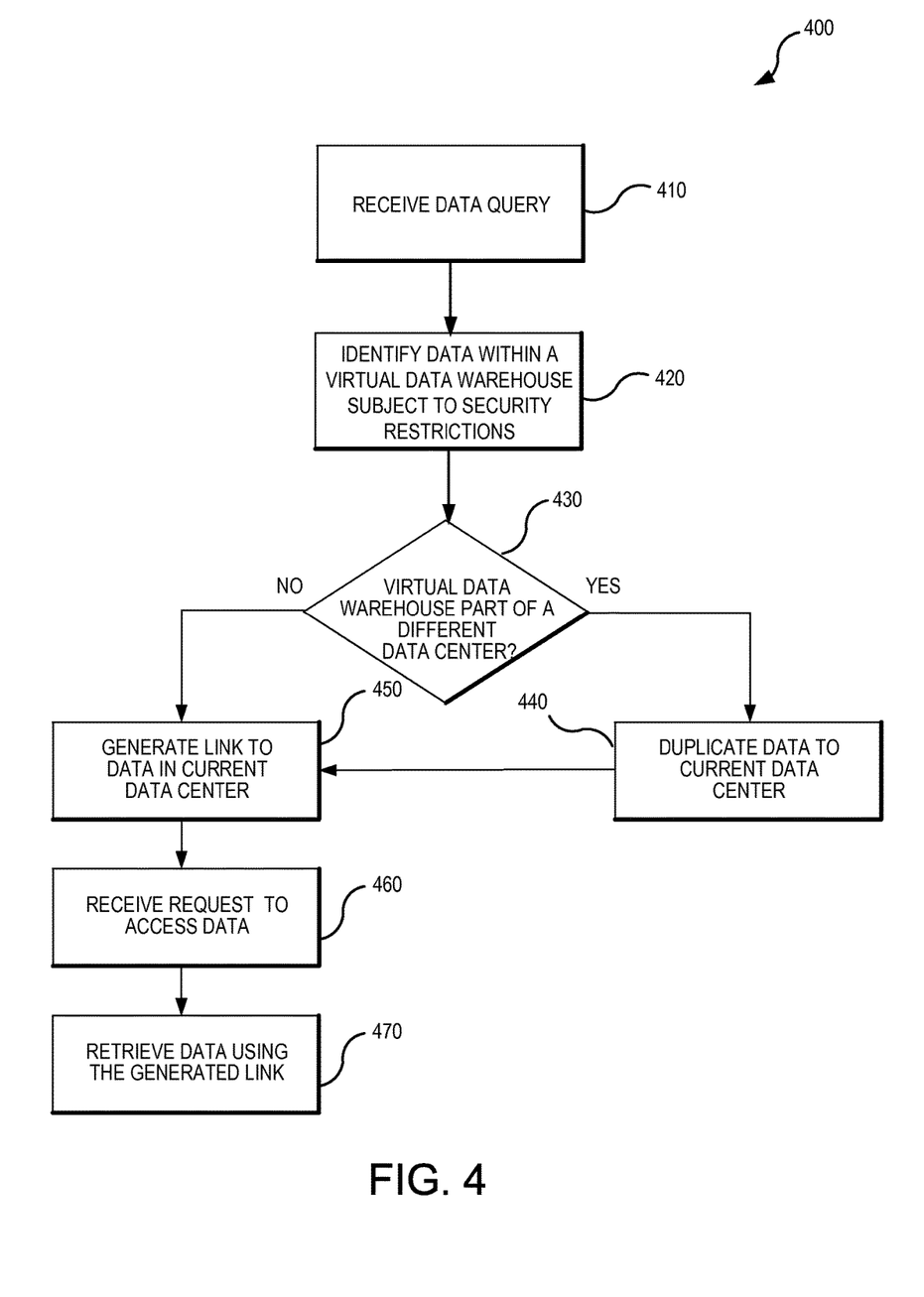
FIG. 4 is a flowchart with a set of operations for retrieving data within a data warehouse environment in accordance with some embodiments of the present invention.

FIG. 4 is a flowchart with a set of operations 400 for retrieving data within data warehouse environment in accordance with some embodiments of the present invention. The operation illustrated in FIG. 4 may be performed by one or more modules or components such as data discovery module 215, linking module 225, and/or processor(s) 210. When a data query is received during query operation 410, data discovery module 215 can search across all of the virtual warehouses and, in some cases, within other multi-tenancy data warehouses. In some embodiments, the virtual data warehouses are modeled as databases or namespaces to aid in logically organizing the data. In these cases, query operation 410 can search for data by accessing indexes associated with databases in the multi-tenancy data warehouse. Identification operation 420 identifies the data returned by query operation 410 and ensures compliance with any security restrictions before presenting the results.

Decision operation 430 can determine if any of the data is located in a virtual warehouse within a different data center. Upon determining that some of the data is part of a different data center, decision operation 430 branches to duplication operation 440 where the data is duplicated to the current data center before linking operation 450 generates a link to the data. When none of the data is part of a different data center, decision operation 430 branches to linking operation 450 where a link to the data is created. Receiving operation 460 is designed to receive a request to access the data. At that point, the data is retrieved during retrieval operation 470 using the link created by linking operation 450.

Figure 5:
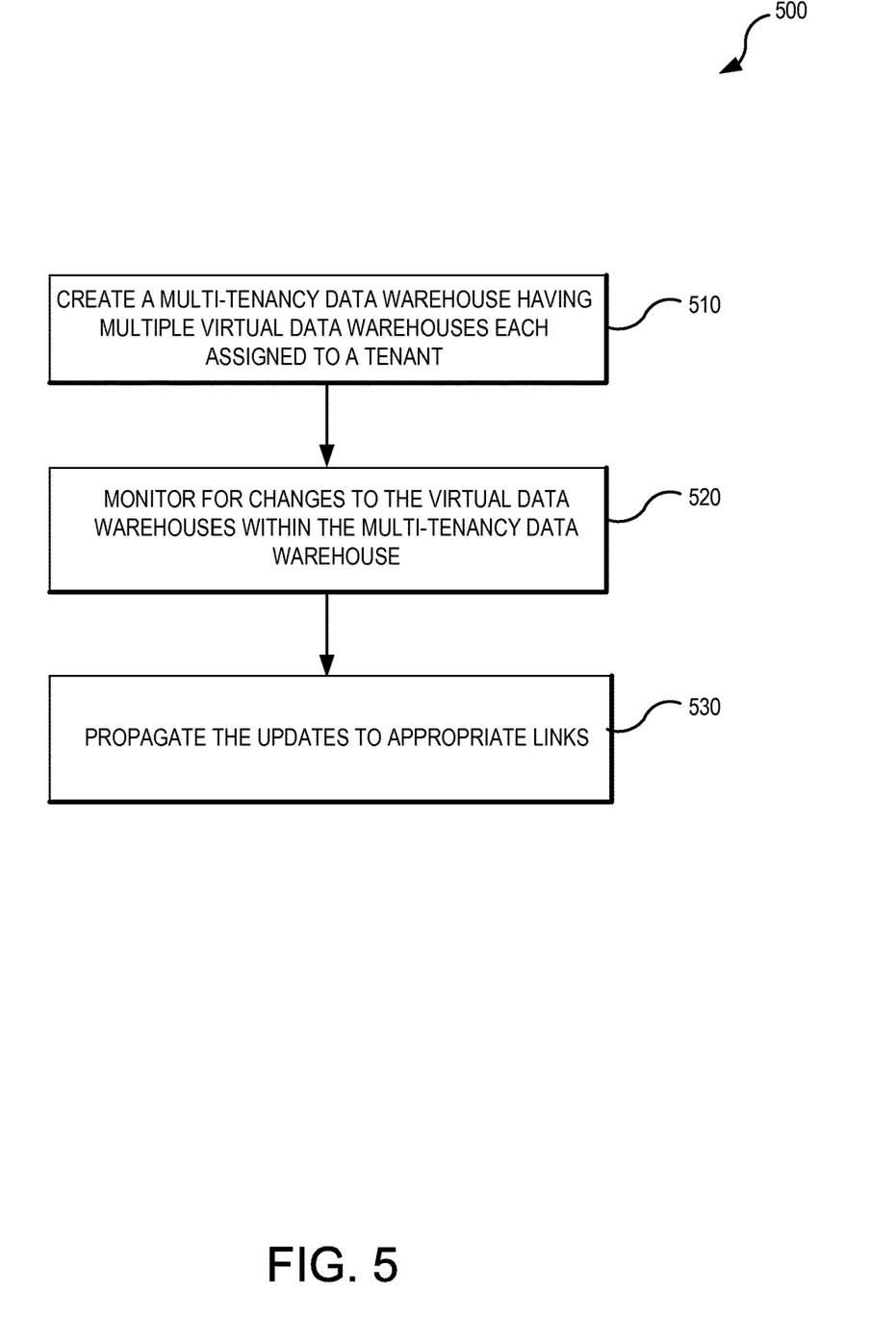
FIG. 5 is a flowchart with a set of operations for propagating updates to table links within a multi-tenancy data warehouse in accordance with various embodiments of the present invention.

FIG. 5 is a flowchart with a set of operations 500 for propagating updates to table links within a multi-tenancy data warehouse in accordance with various embodiments of the present invention. The operation illustrated in FIG. 5 may be performed by one or more modules or components such as tenant assignment module 220, propagation module 255, and/or processor(s) 210. During assignment operation 510 a multi-tenancy data warehouse is created having multiple virtual warehouses that are each assigned to a tenant (e.g., using tenant assignment module 220). A tenant can be one or more individual company employees, a team (e.g., within a single company or from across multiple companies) having one or more team members, or other combination of one or more individuals or groups (e.g., individuals inside or outside of a company or organization). Within the multi-tenancy data warehouse one or more links may be created to link data or data tables across one or more of the virtual data warehouses thus allowing a first tenant assigned to a first virtual data warehouse to access data within a second virtual data warehouse.

Monitoring operation 520 monitors for changes to the virtual data warehouse within the multi-tenancy data warehouse. These changes can be detected using various commands within the data warehouse operating system. Once the changes are detected, propagation operation 530 propagates the updates to the appropriate links. For example, when data is deleted from a virtual data warehouse, monitoring operation 520 detects the change and propagation operation 530 removes any link or portion of a link that refers to that data. As another example, data may be transferred from one virtual data warehouse to another virtual data warehouse. Again, monitoring operation 520 detects the change in storage location and propagation operation 530 updates any links that refers to that data to indicate the new location.

Social Networking System Architecture

Embodiments of the present invention can be utilized within a social networking system. Typically, a social networking system includes one or more computing devices storing user profiles associated with users and/or other objects as well as connections between users and other users and/or objects. In use, users join the social networking system and then add connections to other users or objects of the social networking system to which they desire to be connected. The users may be individuals or entities such as businesses, organizations, universities, or manufacturers. The social networking system allows its users to interact with each other as well as with other objects maintained by the social networking system. In some embodiments, the social networking system allows users to interact with third-party websites and financial account providers.

Based on stored data about users, objects, and connections between users and/or objects, the social networking system can generate and maintain a "social graph" comprising a plurality of nodes interconnected by a plurality of edges. Each node in the social graph represents an object or user that can act on another node and/or that can be acted on by another node. An edge between two nodes in the social graph represents a particular kind of connection between the two nodes, which may result from an action that was performed by one of the nodes on the other node. For example, when a user identifies an additional user as a friend, an edge in the social graph is generated connecting a node representing the first user and an additional node representing the additional user. The generated edge has a connection type indicating that the users are friends. As various nodes interact with each other, the social networking system can modify edges connecting the various nodes to reflect the interactions.

Figure 6:
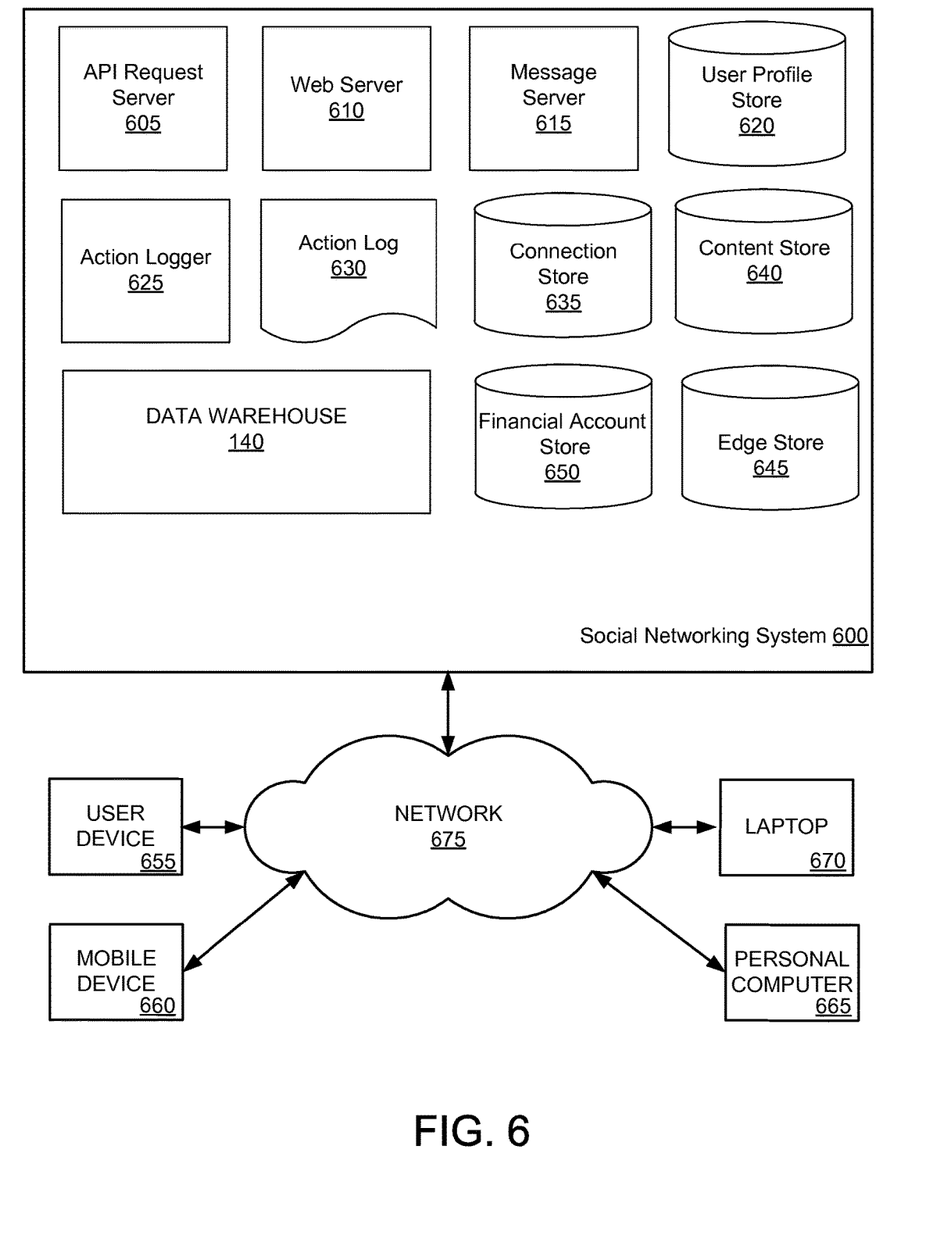
FIG. 6 is a block diagram of a system architecture of the social networking system with which some embodiments of the present invention may be utilized.

FIG. 6 is a block diagram of a system architecture of the social networking system 600 with which some embodiments of the present invention may be utilized. Social networking system 600 illustrated by FIG. 6 includes API request server 605, web server 610, message server 615, user profile store 620, action logger 625, action log 630, connection store 635, content store 640, edge store 645, financial account store 650, and multi-tenancy data warehouse 140. In other embodiments, social networking system 600 may include additional, fewer, or different modules for various applications. Conventional components such as network interfaces, security mechanisms, load balancers, failover servers, management and network operations consoles, and the like are not shown so as to not obscure the details of the system architecture.

API request server 605 allows other systems, user devices, or tools to access information from social networking system 600 by calling APIs. The information provided by the social network may include user profile information or the connection information of users as determined by their individual privacy settings. For example, a system, user device, or tools interested in accessing data connections within a social networking system may send an API request to social networking system 600 via a network. The API request is received at social networking system 600 by API request server 605. API request server 605 processes the request by submitting the access request to social networking system 600 where access is determined and any data communicated back to the requesting system, user device, or tools via a network.

Web server 610 links social networking system 600 via a network to one or more client devices; the web server serves web pages, as well as other web-related content, such as Java, Flash, XML, and so forth. The web server 610 may communicate with the message server 615 that provides the functionality of receiving and routing messages between social networking system 600 and client devices. The messages processed by message server 615 can be instant messages, queued messages (e.g., email), text and SMS (short message service) messages, or any other suitable messaging technique. In some embodiments, a message sent by a user to another can be viewed by other users of social networking system 600, for example, by the connections of the user receiving the message. An example of a type of message that can be viewed by other users of the social networking system besides the recipient of the message is a wall post. In some embodiments, a user can send a private message to another user that can only be retrieved by the other user.

Each user of the social networking system 600 is associated with a user profile, which is stored in user profile store 620. A user profile includes declarative information about the user that was explicitly shared by the user, and may also include profile information inferred by social networking system 600. In one embodiment, a user profile includes multiple data fields, each data field describing one or more attributes of the corresponding user of social networking system 600. The user profile information stored in user profile store 620 describes the users of social networking system 600, including biographic, demographic, and other types of descriptive information, such as work experience, educational history, gender, hobbies or preferences, location, and the like. A user profile may also store other information provided by the user, for example, images or videos. In certain embodiments, images of users may be tagged with identification information of users of social networking system 600 displayed in an image. A user profile in user profile store 620 may also maintain references to actions by the corresponding user performed on content items in content store 640 and stored in the edge store 645.

A user profile may be associated with one or more financial accounts, allowing the user profile to include data retrieved from or derived from a financial account. A user may specify one or more privacy settings, which are stored in the user profile, that limit information from a financial account that social networking system 600 is permitted to access. For example, a privacy setting limits social networking system 600 to accessing the transaction history of the financial account and not the current account balance. As another example, a privacy setting limits social networking system 600 to a subset of the transaction history of the financial account, allowing social networking system 600 to access transactions within a specified time range, transactions involving less than a threshold transaction amount, transactions associated with specified vendor identifiers, transactions associated with vendor identifiers other than specified vendor identifiers, or any suitable criteria limiting information from a financial account identified by a user that is accessible by social networking system 600. In one embodiment, information from the financial account is stored in user profile store 620. In other embodiments, it may be stored in financial account store 650.

Action logger 625 receives communications about user actions on and/or off social networking system 600, populating action log 630 with information about user actions. Such actions may include, for example, adding a connection to another user, sending a message to another user, uploading an image, reading a message from another user, viewing content associated with another user, and attending an event posted by another user, among others. In some embodiments, action logger 625 receives, subject to one or more privacy settings, transaction information from a financial account associated with a user and identifies user actions from the transaction information. For example, action logger 625 retrieves vendor identifiers from the financial account's transaction history and identifies an object, such as a page, in social networking system 600 associated with the vendor identifier. This allows action logger 625 to identify a user's purchases of products or services that are associated with a page, or another object, in content store 640. In addition, a number of actions described in connection with other objects are directed at particular users, so these actions are associated with those users as well. These actions are stored in action log 630.

Action log 630 may be used by social networking system 600 to track user actions on social networking system 600, as well as external websites that communicate information to social networking system 600. Users may interact with various objects on social networking system 600, including commenting on posts, sharing links, and checking-in to physical locations via a mobile device, accessing content items in a sequence, or other interactions. Information describing these actions is stored in action log 630. Additional examples of interactions with objects on social networking system 600 included in action log 630 include commenting on a photo album, communications between users, becoming a fan of a musician, adding an event to a calendar, joining a group, becoming a fan of a brand page, creating an event, authorizing an application, using an application, and engaging in a transaction. Additionally, action log 630 records a user's interactions with advertisements on social networking system 600 as well as other applications operating on social networking system 600. In some embodiments, data from action log 630 is used to infer interests or preferences of the user, augmenting the interests included in the user profile and allowing a more complete understanding of user preferences.

Action log 630 may also store user actions taken on external websites and/or determined from a financial account associated with the user. For example, an e-commerce website that primarily sells sporting equipment at bargain prices may recognize a user of social networking system 600 through social plug-ins that enable the e-commerce website to identify the user of social networking system 600. Because users of social networking system 600 are uniquely identifiable, e-commerce websites, such as this sporting equipment retailer, may use the information about these users as they visit their websites. Action log 630 records data about these users, including webpage viewing histories, advertisements that were engaged, purchases made, and other patterns from shopping and buying. Actions identified by action logger 625 from the transaction history of a financial account associated with the user allow action log 630 to record further information about additional types of user actions.

In some embodiments, social networking system 600 further stores data describing one or more connections between different users in the connection store 635. The data describing one or more connections can include a list of connections, a date each connection (i.e., friendship) was made, etc. The connections may be further defined by users, allowing users to specify their relationships with other users. For example, the connections allow users to generate relationships with other users that parallel the users' real-life relationships, such as friends, co-workers, partners, and so forth. In one embodiment, the connection specifies a connection type based on the type of relationship. Examples of the type of relationship include family, friend, colleague, etc. Users may select from predefined types of connections, or define their own connection types as needed. Some or all of this information may also be stored as edge objects in edge store 645.

Content store 640 stores content items associated with a user profile, such as images, videos, or audio files. Content items from content store 640 may be displayed when a user profile is viewed or when other content associated with the user profile is viewed. For example, displayed content items may show images or video associated with a user profile or show text describing a user's status. Additionally, other content items may facilitate user engagement by encouraging a user to expand his connections to other users, to invite new users to the system, or to increase interaction with the social network system by displaying content related to users, objects, activities, or functionalities of social networking system 600. Examples of social networking content items include suggested connections or suggestions to perform other actions, media provided to, or maintained by, social networking system 600 (e.g., pictures or videos), status messages or links posted by users to the social networking system, events, groups, pages (e.g., representing an organization or commercial entity), and any other content provided by, or accessible via, the social networking system.

Content store 640 also includes one or more pages associated with entities having user profiles in user profile store 620. An entity is a non-individual user of social networking system 600, such as a business, a vendor, an organization, or a university. A page includes content associated with an entity and instructions for presenting the content to a social networking system user. For example, a page identifies content associated with the entity's user profile as well as information describing how to present the content to users viewing the brand page. Vendors may be associated with pages in content store 640, allowing social networking system users to more easily interact with the vendor via social networking system 600. A vendor identifier is associated with a vendor's page, allowing social networking system 600 to identify the vendor and/or to retrieve additional information about the vendor from user profile store 620, action log 630, or from any other suitable source using the vendor identifier. In some embodiments, the content store 640 may also store one or more targeting criteria associated with stored objects and identifying one or more characteristics of a user to which the object is eligible to be presented.

In one embodiment, edge store 645 stores the information describing connections between users and other objects on social networking system 600 in edge objects. Some edges may be defined by users, allowing users to specify their relationships with other users. For example, users may generate edges with other users that parallel the users' real-life relationships, such as friends, co-workers, partners, and so forth. Other edges are generated when users interact with objects in social networking system 600, such as expressing interest in a page on the social networking system 600, sharing a link with other users of the social networking system 600, and commenting on posts made by other users of the social networking system. Edge store 645 stores edge objects that include information about the edge, such as affinity scores for objects, interests, and other users. Affinity scores may be computed by social networking system 600 over time to approximate a user's affinity for an object, interest, and other users in social networking system 600 based on the actions performed by the user. Multiple interactions between a user and a specific object may be stored in one edge object in edge store 645, in one embodiment. In some embodiments, connections between users may be stored in user profile store 620, or user profile store 620 may access edge store 645 to determine connections between users.

The users can interact with social networking system 600 through user devices 655, mobile devices 660, personal computers 665, laptops 670, and/or other devices to allow the user to communicate with social networking system 600. As illustrated in FIG. 6, these devices may use network 675 to submit and retrieve information from social networking system 600. User device 655 can be any computing device capable of receiving user input as well as transmitting and/or receiving data via the network 675. In one embodiment, user device 655 is a conventional computer system, such as a desktop 665 or laptop computer 670. In another embodiment, user device 655 may be mobile device 660 having computer functionality, such as a personal digital assistant (PDA), mobile telephone, smart-phone, or similar device.

User device 655 is configured to communicate with social networking system 600 and/or the financial account provider via the network 675. In one embodiment, user device 655 executes an application allowing a user of user device 655 to interact with the social networking system 600. For example, user device 655 can execute a browser application to enable interaction between the user device 655 and social networking system 600 via the network 675. In another embodiment, user device 655 interacts with social networking system 600 through an application programming interface (API) that runs on the native operating system of the user device 655, such as IOS® or ANDROID™.

User devices 655 can be configured to communicate via the network 675, which may comprise any combination of local area and/or wide area networks, using both wired and wireless communication systems. In one embodiment, network 675 uses standard communications technologies and/or protocols. Thus, network 675 may include links using technologies such as Ethernet, 802.11, worldwide interoperability for microwave access (WiMAX), 3G, 4G, CDMA, digital subscriber line (DSL), etc. Similarly, the networking protocols used on network 675 may include multiprotocol label switching (MPLS), transmission control protocol/Internet protocol (TCP/IP), User Datagram Protocol (UDP), hypertext transport protocol (HTTP), simple mail transfer protocol (SMTP), and file transfer protocol (FTP). Data exchanged over network 675 may be represented using technologies and/or formats including hypertext markup language (HTML) or extensible markup language (XML). In addition, all or some links can be encrypted using conventional encryption technologies such as secure sockets layer (SSL), transport layer security (TLS), and Internet Protocol security (IPsec).

Exemplary Computer System Overview

Figure 7:
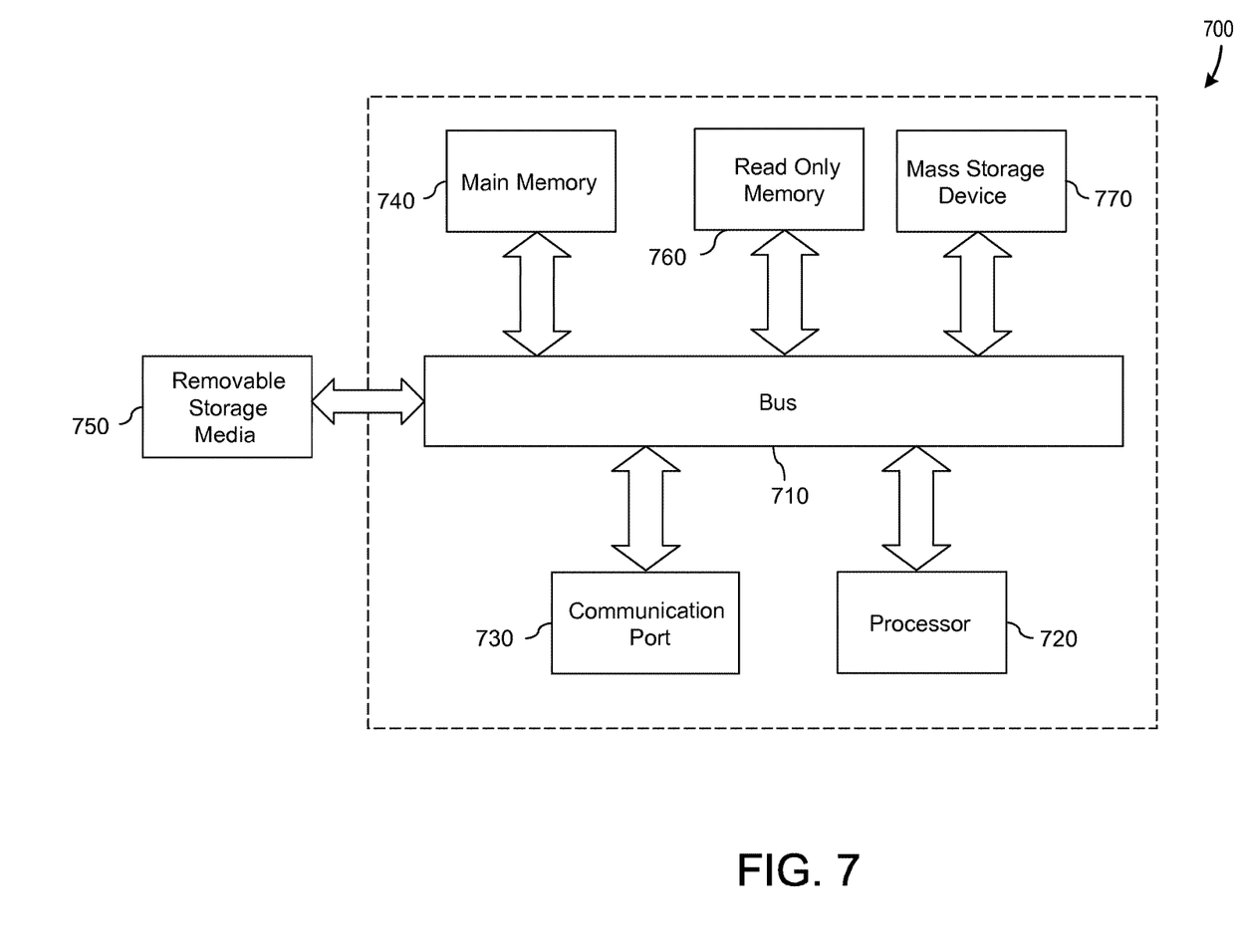
FIG. 7 illustrates an example of a computer system with which some embodiments of the present invention may be utilized.

Embodiments of the present invention include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 7 is an example of a computer system 700 with which embodiments of the present invention may be utilized. According to the present example, the computer system includes a bus 710, at least one processor 720, at least one communication port 730, a main memory 740, a removable storage media 750, a read only memory 760, and a mass storage 770.

Processor(s) 720 can be any known processor, such as, but not limited to, an Intel® Itanium® or Itanium 2® processor(s); AMD® Opteron® or Athlon MP® processor(s); or Motorola® lines of processors. Communication port(s) 730 can be any of an RS-232 port for use with a modem-based dialup connection, a 10/100 Ethernet port, or a Gigabit port using copper or fiber. Communication port(s) 730 may be chosen depending on a network such as a Local Area Network (LAN), Wide Area Network (WAN), or any network to which the computer system 700 connects.

Main memory 740 can be Random Access Memory (RAM) or any other dynamic storage device(s) commonly known in the art. Read only memory 760 can be any static storage device(s) such as Programmable Read Only Memory (PROM) chips for storing static information such as instructions for processor 720.

Mass storage 770 can be used to store information and instructions. For example, hard disks such as the Adaptec® family of SCSI drives, an optical disc, an array of disks such as RAID, such as the Adaptec family of RAID drives, or any other mass storage devices may be used.

Bus 710 communicatively couples processor(s) 720 with the other memory, storage and communication blocks. Bus 710 can be a PCI/PCI-X or SCSI based system bus depending on the storage devices used.

Removable storage media 750 can be any kind of external hard-drives, floppy drives, IOMEGA® Zip Drives, Compact Disc-Read Only Memory (CD-ROM), Compact Disc-Re-Writable (CD-RW), and/or Digital Video Disk-Read Only Memory (DVD-ROM).

The components described above are meant to exemplify some types of possibilities. In no way should the aforementioned examples limit the scope of the invention, as they are only exemplary embodiments.

In conclusion, the present invention provides novel systems, methods and arrangements for managing data within a multi-tenancy data warehouse. While detailed descriptions of one or more embodiments of the invention have been given above, various alternatives, modifications, and equivalents will be apparent to those skilled in the art without varying from the spirit of the invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations that fall within the scope of the claims, together with all equivalents thereof. Therefore, the above description should not be taken as limiting the scope of the invention, which is defined by the appended claims.

What is claimed is:

1. A method, comprising:
   receiving a data query from a tenant assigned to a first virtual data warehouse included in a plurality of virtual data warehouses located within a multi-tenancy data warehouse, wherein the first virtual data warehouse is a database part of a first physical data center,
      wherein the tenant is associated with multiple namespaces, wherein the data query identifies a first namespace of the multiple namespaces, wherein the multiple namespaces are mapped to the multi-tenancy data warehouse, wherein the multi-tenancy data warehouse corresponds to a physical data warehouse, and wherein the first virtual data warehouse is included in a first physical data center;
   generating a set of information, based on the data query, indicating data the tenant is authorized to access within the multi-tenancy data warehouse;
   receiving a declaration from the tenant to utilize a subset of the data which the tenant can access as indicated by the set of information;
   determining whether the subset of the data is in a second physical data center that is different from the first physical data center;
   in response to determining the subset of the data is in a second physical data center different from the first physical data center, caching the subset of the data from the second physical data center in the first physical data center and generating a link identifying a set of parameters for retrieving the data, wherein the set of parameters comprises a time range of data to be retrieved;
   importing data that is outside of the first virtual data warehouse using the link;
   preventing access, by the first namespace using a two-part name syntax, to a second virtual warehouse by the first virtual data warehouse, wherein the second virtual data warehouse is included in the plurality of virtual data warehouses;
   monitoring utilization of the data outside of the first virtual data warehouse;
   determining the utilization of the data only includes data from a smaller time range; and
   updating the set of parameters so that the link only retrieves the data from the smaller time range.

2. The method of claim 1, wherein the first virtual data warehouse is one of a plurality of databases that are included in the multi-tenancy data warehouse and the method further comprises assigning one or more tenants to each of the plurality of databases in the first virtual data warehouse.

3. The method of claim 1, wherein the link provides read-only access to the data outside of the first virtual data warehouse.

4. A computer-implemented method comprising:
   generating a multi-tenancy data warehouse by creating multiple virtual data warehouses that are each assigned to a tenant, wherein a first virtual data warehouse of the multiple virtual data warehouses includes a link that identifies the tenant based on a namespace and links to a data table stored within a second virtual data warehouse of the multiple virtual data warehouses to allow the tenant to access the data table without copying the data table from the second virtual data warehouse to the first virtual data warehouse, wherein the namespace is included in multiple namespaces associated with the tenant, wherein the multiple namespaces are mapped to the multi-tenancy data warehouse, wherein the multi-tenancy data warehouse corresponds to a physical data warehouse, wherein the first virtual data warehouse is included in a first physical data center, and wherein the link to the data table includes a time frame restriction;
   monitoring for changes within the multi-tenancy data warehouse that would require the link to be updated, wherein the changes include an addition or a dropping of a partition in the data table stored within the second virtual data warehouse;
   updating the link in accordance with the changes detected within the multitenancy data warehouse;
   determining that the tenant requested data from another multi-tenancy data warehouse that is different from the multi-tenancy data warehouse;
   copying the requested data from the other multi-tenancy data warehouse to the multi-tenancy data warehouse;
   preventing access, by the namespace using a two-part name syntax, to a second virtual data warehouse by the first virtual data warehouse, wherein the second virtual data warehouse is included in the plurality of virtual data warehouses;
   monitoring access to the data table to determine an amount of the data table actually used; and
   updating the link to the data table to include a second time frame restriction that corresponds to an amount of the data table actually used.

5. The computer-implemented method of claim 4, wherein the changes within the multi-tenancy data warehouse include a transfer of one of the multiple virtual data warehouses to a second multi-tenancy data warehouse.

6. The computer-implemented method of claim 4, wherein the changes within the multi-tenancy data warehouse include a change in access authorization to the data table and updating the link includes deleting the link.

7. The computer-implemented method of claim 4, wherein the multiple virtual data warehouses include one or more databases which are indexed to allow for data queries from the tenants of the multi-tenancy data warehouse.

* * * * *

UNITED STATES PATENT AND TRADEMARK OFFICE
CERTIFICATE OF CORRECTION

PATENT NO. : 10,339,157 B2  
APPLICATION NO. : 13/766512  
DATED : July 2, 2019  
INVENTOR(S) : Namit Jain et al.

Page 1 of 1

It is certified that error appears in the above-identified patent and that said Letters Patent is hereby corrected as shown below:

On the Title Page

In Column 1, item (72), Inventors, Line 1, delete "Hyderbad, IN (US);" and insert -- Hyderabad (IN); --, therefor.

In Column 1, item (72), Inventors, Line 5, delete "Union Ciy," and insert -- Union City, --, therefor.

Signed and Sealed this  
Twenty-second Day of October, 2019

Andrei Iancu  
*Director of the United States Patent and Trademark Office*